US008583356B2

(12) United States Patent
Thomassen

(10) Patent No.: US 8,583,356 B2
(45) Date of Patent: Nov. 12, 2013

(54) NAVIGATION DEVICE AND METHOD

(75) Inventor: Erik Thomassen, Delft (NL)

(73) Assignee: TomTom International B.V., Amsterdam (NL)

( * ) Notice: Subject to any disclaimer, the term of this patent is extended or adjusted under 35 U.S.C. 154(b) by 967 days.

(21) Appl. No.: 12/007,139

(22) Filed: Jan. 7, 2008

(65) Prior Publication Data

US 2009/0177396 A1 Jul. 9, 2009

(51) Int. Cl.
*G01C 21/00* (2006.01)

(52) U.S. Cl.
USPC .......................................................... 701/213

(58) Field of Classification Search
USPC ............................ 701/213, 208, 210; 340/990
See application file for complete search history.

(56) References Cited

U.S. PATENT DOCUMENTS

| | | | |
|---|---|---|---|
| 5,864,305 A * | 1/1999 | Rosenquist | 340/905 |
| 6,154,703 A * | 11/2000 | Nakai et al. | 701/200 |
| 6,253,151 B1 | 6/2001 | Ohler et al. | |
| 6,456,938 B1 * | 9/2002 | Barnard | 701/213 |
| 6,882,934 B2 * | 4/2005 | Yamashita et al. | 701/208 |
| 7,564,376 B2 * | 7/2009 | Jang | 340/995.1 |
| 7,865,304 B2 * | 1/2011 | Gretton et al. | 701/418 |
| 2007/0150186 A1 | 6/2007 | Ingulsrud | |

FOREIGN PATENT DOCUMENTS

| | | |
|---|---|---|
| EP | 1840514 A | 10/2007 |
| JP | 2003202803 A | 7/2003 |

* cited by examiner

*Primary Examiner* — Michelle Le

(57) ABSTRACT

A method of correcting map data stored on a portable navigation device or navigation system is described, together with an appropriately enabled device or navigation system. A computer program enabling the method is also described. The method includes the steps of displaying map data on a PND or navigation system during a navigation or free-driving mode, and is characterized in that at least one of a plurality of user-selectable graphical indicators is displayed together with said map data adjacent or overlaid on the particular thoroughfare along which the device is currently traveling, the indicator graphically representing a travel restriction pertinent to one of either the current thoroughfare or a subsequent thoroughfare occurring after a thoroughfare intersection towards which the current thoroughfare leads.

16 Claims, 6 Drawing Sheets

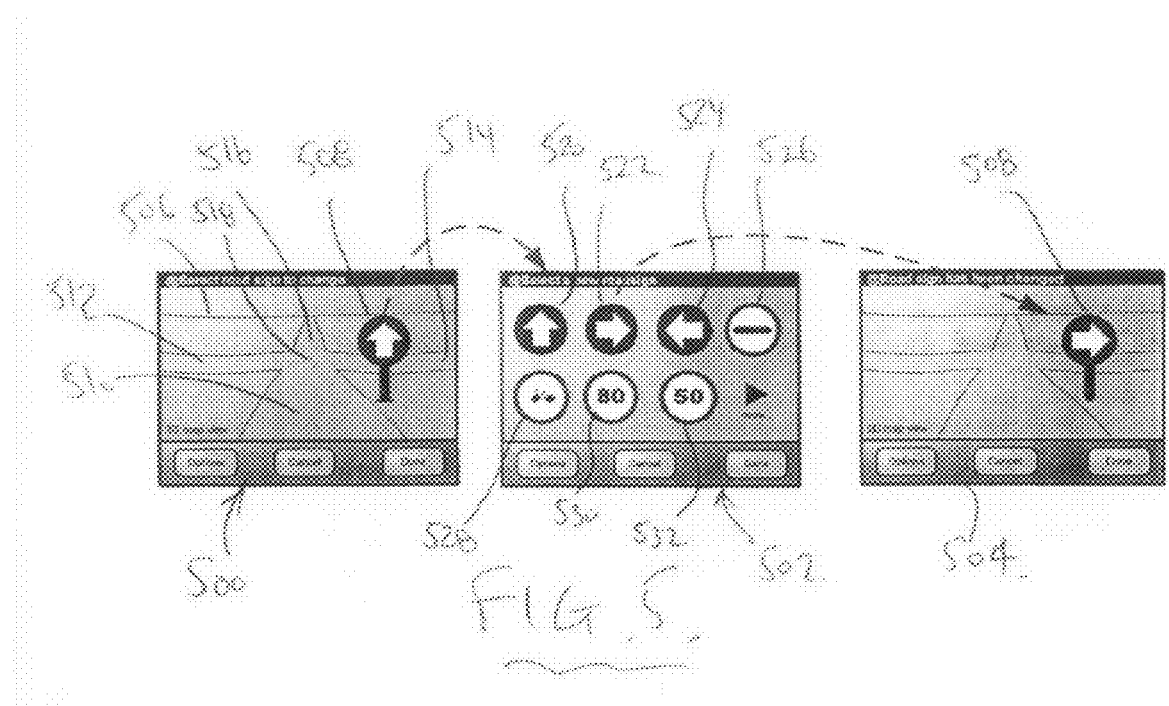

NAVIGATION DEVICE AND METHOD

BACKROUND OF THE INVENTION

Portable navigation devices (PNDs) including GPS (Global Positioning System) signal reception and processing means are well known and are widely employed as in-car navigation systems. In essence, modem PNDs comprise:
- a processor,
- memory (at least one of volatile and non-volatile, and commonly both),
- map data stored within said memory,
- a software operating system and optionally one or more additional programs executing thereon, to control the functionality of the device and provide various features,
- a GPS antenna by which satellite-broadcast signals including location data can be received and subsequently processed to determine a current location of the device,
- optionally, electronic gyroscopes and accelerometers which produce signals capable of being processed to determine the current angular and linear acceleration, and in turn, and in conjunction with location information derived from the GPS signal, velocity and relative displacement of the device and thus the vehicle in which it is mounted,
- input and output means, examples including a visual display (which may be touch sensitive to allow for user input), one or more physical buttons to control on/off operation or other features of the device, a speaker for audible output,
- optionally one or more physical connectors by means of which power and optionally one or more data signals can be transmitted to and received from the device, and
- optionally one or more wireless transmitters/receivers to allow communication over mobile telecommunications and other signal and data networks, for example Wi-Fi, Wi-Max GSM and the like.

The utility of the PND is manifested primarily in its ability to determine a route between a start or current location and a destination, which can be input by a user of the computing device, by any of a wide variety of different methods, for example by postcode, street name and number, and previously stored well known, favourite or recently visited destinations. Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice. In addition, the device may continually monitor road and traffic conditions, and offer to or choose to change the route over which the remainder of the journey is to be made due to changed conditions. Real time traffic monitoring systems, based on various technologies (e.g. mobile phone calls, fixed cameras, GPS fleet tracking) are being used to identify traffic delays and to feed the information into notification systems.

The navigation device may typically be mounted on the dashboard of a vehicle, but may also be formed as part of an on-board computer of the vehicle or car radio. The navigation device may also be (part of) a hand-held system, such as a PDA (Personal Navigation Device) a media player, a mobile phone or the like, and in these cases, the normal functionality of the hand-held system is extended by means of the installation of software on the device to perform both route calculation and navigation along a calculated route. In any event, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function provided, and the navigation along such a route is another primary function. During navigation along a calculated route, the PND provides visual and/or audible instructions to guide the user along a chosen route to the end of that route, that is the desired destination. It is usual for PNDs to display map information on-screen during the navigation, such information regularly being updated on-screen so that the map information displayed is representative of the current location of the device, and thus of the user or user's vehicle if the device is being used for in-car navigation. An icon displayed on-screen typically denotes the current device location, and is centred with the map information of current and surrounding roads and other map features being also displayed. Additionally, navigation information may be displayed, optionally in a status bar above, below or to one side of the displayed map information, examples of navigation information including the distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that
- a user deviates from the previously calculated route during navigation therealong,
- real-time traffic conditions dictate that an alternative route would be more expedient and the device is suitably enabled to recognize such conditions automatically, or
- if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and taffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

One particular and more pressing requirement for modern PNDs is the need to update and/or correct the map information stored in the memory of the device, as such information becomes gradually obsolete. Of course, although major routes within the map information, such as motorways, highways and other arterial roads are unlikely to change much over time, the routes within city centres are being continuously modified, enhanced or restricted to improve traffic flow through a city or to prevent traffic from entering certain zones as the shopping areas become increasingly pedestrianized.

U.S. Pat. No. 6,253,151 describes a feature whereby an end user of a navigation system that uses geographic data can easily report perceived errors or inaccuracies in the geographic data or other problems such as poor quality route calculation or guidance. The end user uses a user interface of the navigation system to indicate the perceived error, inaccuracy, or other problem. The navigation system includes a report program that operates in response to the end user's indication. The report program collects information indicating the error, inaccuracy, or other problem and sends a report including the collected information to a geographic database developer. The geographic database developer can use the information in the report to update a geographic database.

The above system however is more concerned with ensuring that a centralized geographical or map database of a map data provider is as current and accurate as possible, as opposed to the correction of the current map data stored on the device.

In more recent devices, such as the TomTom® GO720 available from the applicant herefor, a user interface menu structure is provided whereby the user can correct errors in the underlying map data, for example by entering specific road identification information, postcode data, or further specific road segment information, in a similar manner to that when the user wishes to enter a navigation destination prior to the route calculation function performed by the device. Once the correct road or road segment is identified, a further menu is provided on the screen of the device to enable the user to identify which of a number of different corrections is to be made, for example the permitted direction of travel along that road segment, access restrictions both in terms of times of the day and vehicle types, the speed limit, pedestrianization, and possibly vehicle height and/or width restrictions.

As a user makes such corrections, they may be stored in memory for later upload to a centralized server, but more importantly in the context of this invention, such corrections may be stored locally in the device and be recalled during navigation and route calculation to ensure the most reliable operation of the device, whether operating in a route guidance or free-driving mode. For instance, if a particular road has a relevant correction applied thereto, the route calculation algorithms will only include the particular road in a route if, as corrected, it is appropriate to do so.

While the correction of map data locally in a PND or navigation system is known, as is the subsequent upload of correction data to a centralized server, a primary disadvantage with the correction facility provided on modern PNDs is the need to access a menu structure which subsequently involves identification of a particular route, road or road segment. Obviously, it can be dangerous to enter this information while driving, and after a user has arrived at a destination after driving a particular route during which the making of a correction would have been appropriate, the need to make the correction is often forgotten, particularly in cases where a number of corrections might have been required.

It is an object of the present invention to provide a PND or navigation system, a method of operating such, and a computer program by means of which such are controlled, which provides an enhanced method of correcting the map data stored in the PND or navigation system.

BRIEF SUMMARY OF THE INVENTION

According to the present invention there is provided a method of correcting map data stored on a PND or navigation system, said method including the steps of displaying map data during a navigation or free-driving mode, and characterized in that at least one of a plurality of user-selectable graphical indicators is displayed together with said map data adjacent or overlaid on the particular thoroughfare along which the device is currently traveling, said indicator graphically representing a travel restriction pertinent to one of either the current thoroughfare or a subsequent thoroughfare occurring after a thoroughfare intersection towards which the current thoroughfare leads, and further characterized in that the user selection of said graphical indicator causes display of one or more other similar user-selectable graphical indicators, selection of which causes both a correction to be stored in or removed from memory, said correction including both identification of the travel restriction selected or removed and the relevant thoroughfare to which said restriction applies.

In a preferred embodiment, the selection of the one or more other similar user-selectable graphical indicators causes a correction to be stored in or removed from memory, whereupon or whereafter the device causes the display of earlier displayed map information including the relevant thoroughfare with the previously displayed graphical indicator having been changed or removed as appropriate to reflect the restriction selected or removed.

Preferably, the graphical indicator takes the form of a road sign, preferably displayed, suitably scaled, adjacent the thoroughfare along which the device is currently traveling.

In a most preferred embodiment, the graphical indicator displayed relates to the current thoroughfare in which the device is located.

In a modified aspect of the invention, the map information is preferably displayed on the screen in a 3 dimensional manner, some perspective being provided in the displayed information.

Additionally, it is to be mentioned that the device need not necessarily be operating in a free-driving or navigation mode, but may be in a static route or map browsing mode, wherein a plan view of an enlarged map covering the current location, a home or favourite location, or indeed any location within the map data available on the device chosen by the user, is displayed on the screen of the device or system. In this manner, it is possible for the user to move around a conventional map, zoom in and out thereof, and to cause display of any particular intersection within the map data, whether occurring on a calculated route or not, and if a restriction applies at that intersection, then a suitable selectable graphical indicator is shown on the screen along with the graphically represented map data, in accordance with the invention. Selection of this graphical indicator causes display of a corrective menu of other indicators as previously described.

In a preferred embodiment, selection of said graphical indicator, and selection of the subsequently displayed other user-selectable graphical indicators not only causes the storage or removal of a first correction relevant to one or more first thoroughfare approaching or receding from a thoroughfare intersection, but also the storage or removal of a second correction, dependent on and determined from the selectedly stored or removed first correction, and relevant to one or more second thoroughfares approaching or receding from said thoroughfare intersection.

The above arrangement allows for a user to make a correction for any of a current or a subsequent thoroughfare or intersection, or any specifically chosen thoroughfare or intersection, and for the PND or navigation system to make a calculation such that appropriate other corrections are applied or removed for other thoroughfares approaching or emanating from proximate or other appropriate thoroughfares or intersections. When the device or system operates in this manner, and a user subsequently travels along one of the thoroughfares for which an appropriate calculated or derived correction has been made, the suitable graphical indicator representing the stored correction (or if appropriate, the restriction reinstated by removal of the correction) is displayed adjacent or superposed on that thoroughfare during map information display.

Most preferably, the map display occurs in a 3D manner, and the graphical indicator is displayed adjacent the current thoroughfare, most preferably proximate an imminently approaching intersection, and suitably scaled such that the restriction indicated is both clearly visible during map display, and capable of being selected by a user by touching the identified restriction part of the graphical indicator.

In further aspects of the invention, a computer program, embodied on computer readable media as required, is provided for implementing the methods described above, as is a PND and/or navigation system adapted to perform the methods described.

BRIEF DESCRIPTION OF THE SEVERAL VIEWS OF THE INVENTION

The present application will be described in more detail below by using example embodiments, which will be explained with the aid of the drawings, in which:

FIG. 5 shows sample screenshots of a PND showing an exemplary embodiment of the invention.

DETAILED DESCRIPTION OF THE INVENTION

Figure 1:
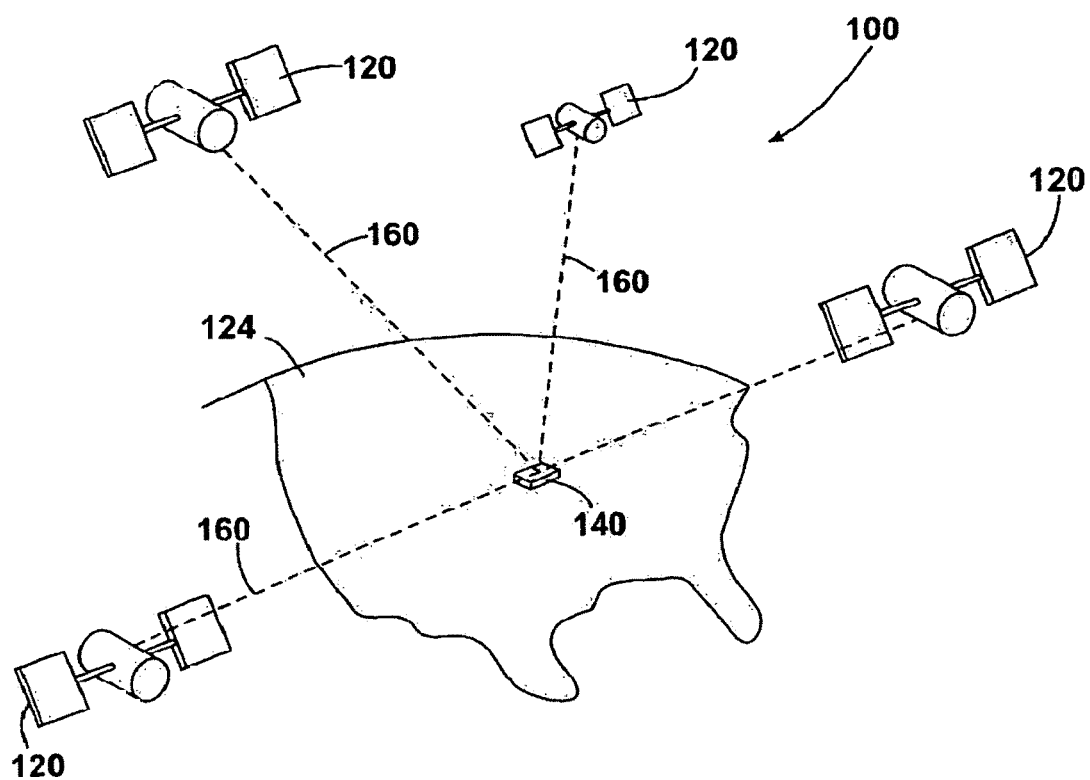
FIG. 1 illustrates an example view of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

Figure 2:
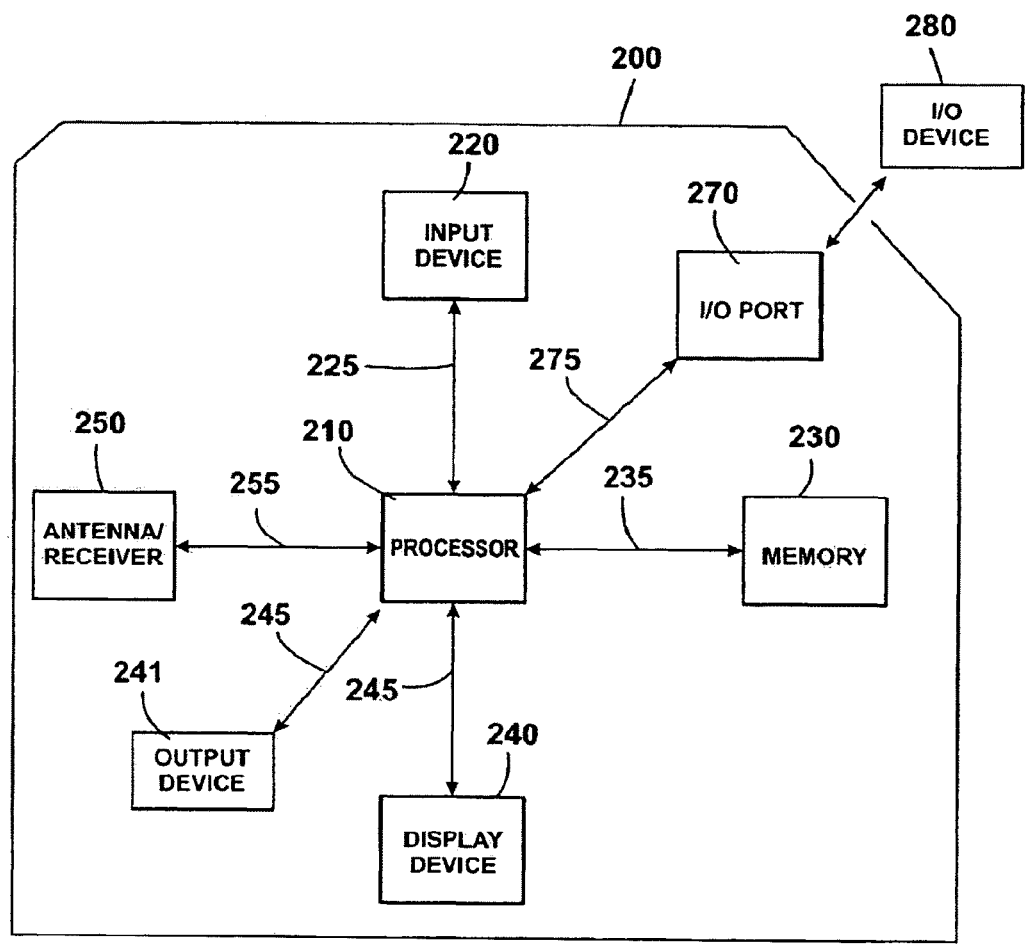
FIG. 2 illustrates an example block diagram of electronic components of a navigation device.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner. FIG. 2 illustrates an example block diagram of electronic components of a navigation device 200, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. The input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 241 can produce audible information to a user of the navigation device 200, it is equally understood that input device 240 can also include a microphone and software for receiving input voice commands as well. In the navigation device 200, processor 210 is operatively connected to and set to receive input information from input device 240 via a connection 225, and operatively connected to at least one of display screen 240 and output device 241, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200 may establish a "mobile" or telecommunications network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
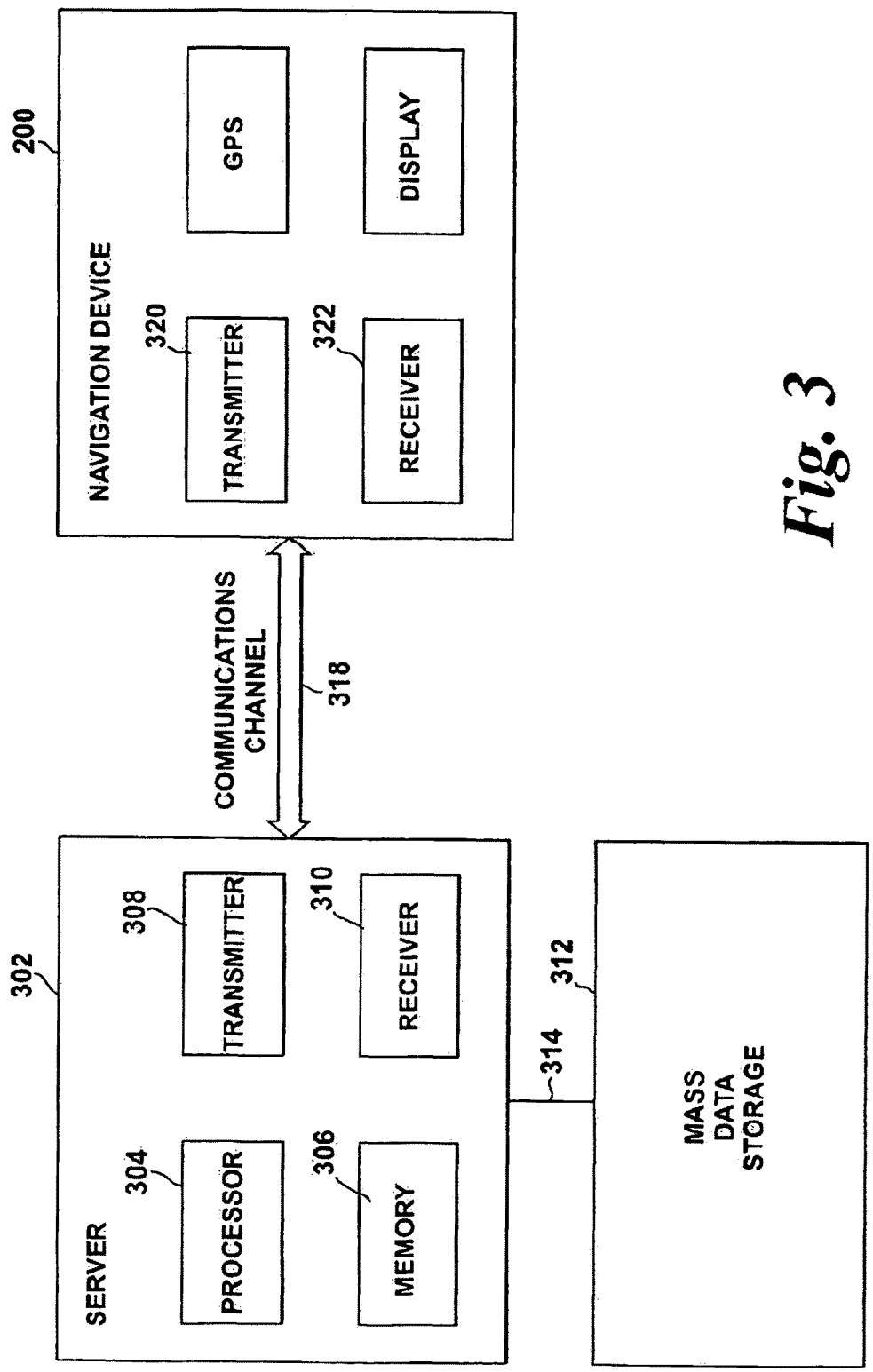
FIG. 3 illustrates an example block diagram of the manner in which a navigation device may receive information over a wireless communication channel.

FIG. 3 illustrates an example block diagram of a server 302 and a navigation device 200 capable of communicating via a generic communications channel 318. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver. Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel. The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, the communication channel 318 can include intermediate devices such as routers, repeaters, buffers, transmitters, and receivers, for example.

For example, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
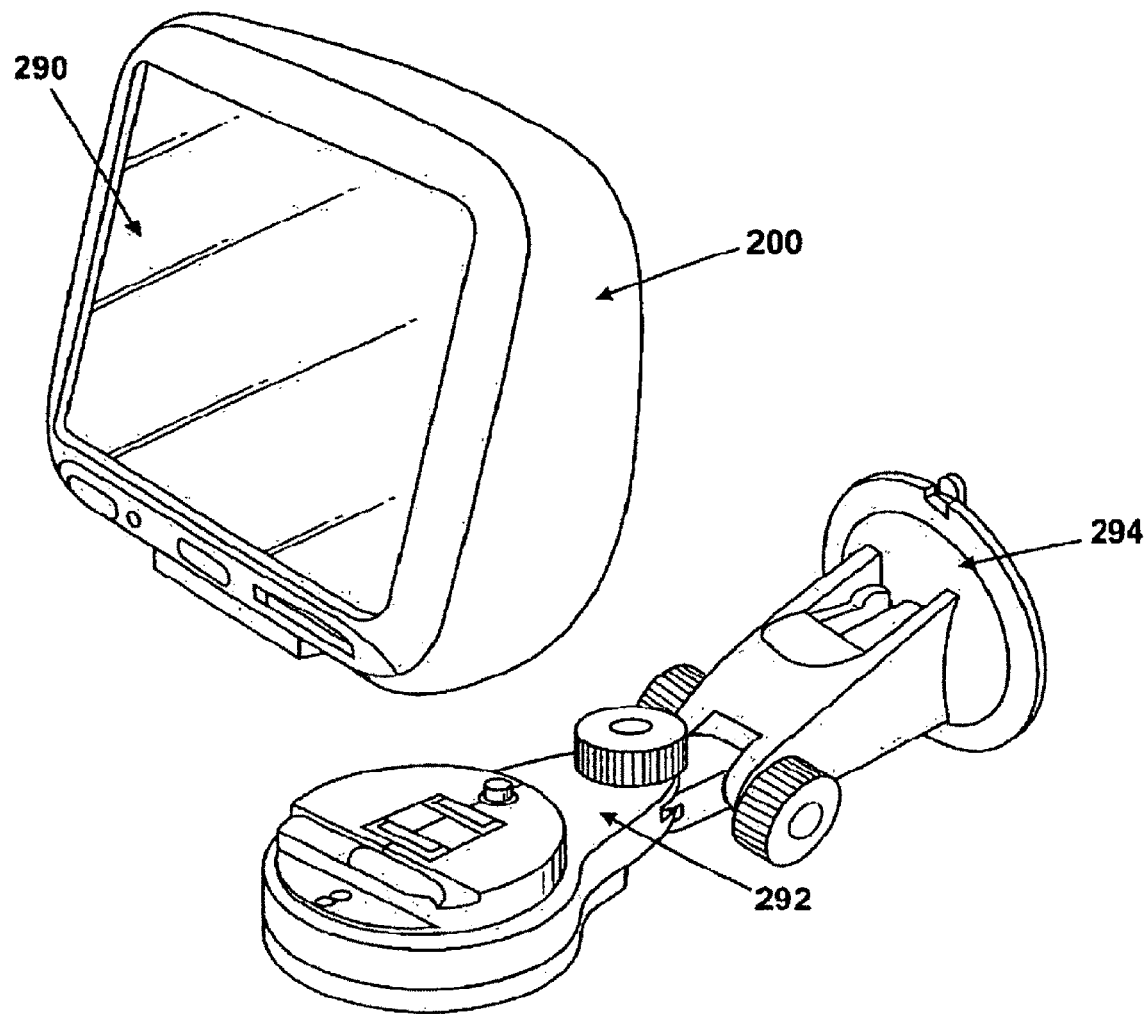
FIGS. 4A and 4B are perspective views of an implementation of an embodiment of the navigation device.
Figure 4B:
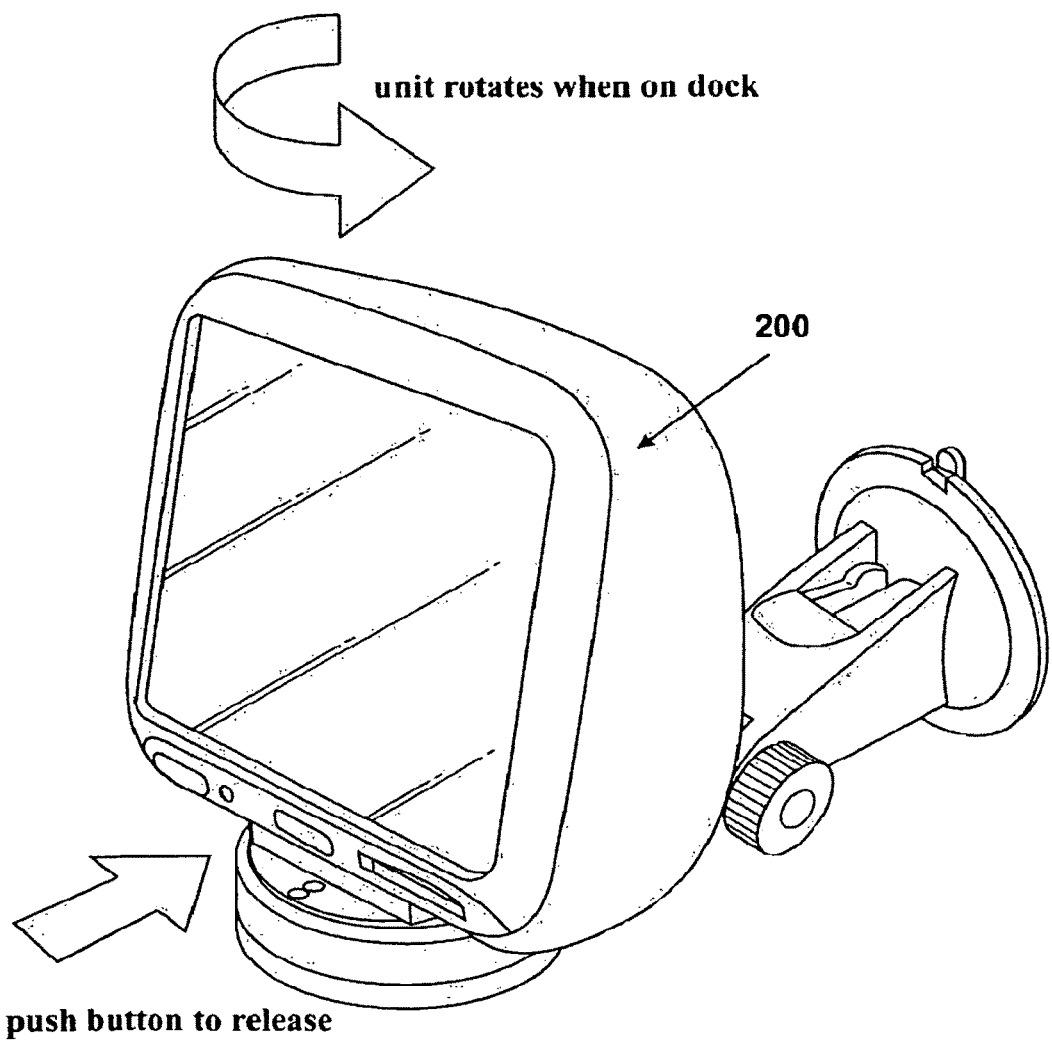

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked. As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

Referring to FIG. 5, there is shown three screenshots 500, 502, 504, from a PND including a display as previously described. As can be seen from these screenshots, the map information is displayed in a 3D mode in which a horizon 506 is usually displayed, and the map information which is displayed (which is generally based on a 2D map data stored in the device memory) is digitally adjusted to provide a perspective from the notional viewpoint of the user, as can be seen in screenshots 500 and 504, it is to be mentioned that the screenshots 500, 504 are only schematic, and much more detailed information may commonly be displayed particularly when operating in a navigation mode. However, in the simple schematic screenshot shown, a virtual signpost 508 is displayed indicating some restriction, in this case applying to a current thoroughfare 510, and possibly to a subsequent thoroughfare 516 occurring after a thoroughfare intersection 518. As will also bee seen from the FIG. 5, the intersection 518 is basically the point at which various thoroughfares 510, 512, 514, 516 coincide. Of course, thoroughfares 510, 516 and 512, 514 may in fact be the same roads, but for the purposes of explaining this invention, they shall be referred to independently.

In screenshot 500, the device is traveling along thoroughfare 510, and virtual sign 508 including a graphical indicator representative of a restriction relevant to the forthcoming thoroughfare 516 is displayed proximate the intersection and adjacent the thoroughfare 510. In the illustration, the graphical indicator 508 shows to the user that the forthcoming road is a one-way road, along which, in the current forward direction of travel, the user would be allowed to travel.

It is of course possible that this restriction is displayed graphically either because a previous correction to base map data has been stored in the device memory, or that the base map data includes some indication that the particular access along a road is restricted to travel in a particular direction.

In the event that this indication is incorrect, whether as a result of the base map data being incorrect or a previous correction applied thereto now being obsolete, then the displayed virtual sign 508 is incorrect. In such case, the user may select the sign by touching the graphical indicator portion thereof whereupon a number of other graphical indicators 520-532, representing different access restrictions, are displayed. This screen allows the user to select the appropriate restriction applicable to the particular thoroughfare(s) forthcoming after the intersection 518. In screenshot 502, the graphical indicator 522 is selected to indicate that the only possible direction of travel available after intersection 518 is along thoroughfare 514, that is, a right turn. Accordingly, as soon as selection of graphical indicator 522 occurs, the display returns to one in which map information is displayed, as shown in screenshot 504, sign 508 having had the appropriate graphical indicator portion corrected according to the selection made.

The selection of the graphical indicator 522 causes one or more background processing tasks to be completed. Firstly, device immediately returns to a display of map information according to the current or previously recorded position of the device. Additionally, the virtual sign 508 is shown corrected or possibly removed in the event that a previously applied correction is reversed, as shown in screenshot 504. Furthermore, the correction being applied or removed causes the storage or removal of a specific correction or update relating to the particular current and/or forthcoming thoroughfare(s) such that the correct virtual sign is not only displayed adjacent the same thoroughfare as shown in screenshots 500 or 504, but also that a suitable virtual sign is shown when the user is traveling along any of the thoroughfares 512, 514, 516 subsequent to the intersection and to which a restriction has been applied or from which a restriction has been removed.

The reader will appreciate that a variety of different combinations are possible, in terms of the thoroughfare(s) to which the virtual signs displayed in conjunction with the map information relate, how such may be corrected, and how those corrections may be applied and interpreted subsequently, but such are easily derived and certainly contemplated within the scope of the present invention.

Although not shown in FIG. 5, the virtual signs 508 may be replaced with or enhanced by further graphical indicators displayed within the delineations defining the particular thoroughfares 510-516. Such indicators may take the form of simple arrows, being indicative of travel restrictions along a particular thoroughfare, or alternatively may take the form of coloured icons indicating the type of restrictions in place along that thoroughfare. For instance, the graphical indicator portion of the sign might be graphically displayed, scaled as appropriate within the delineations defining thoroughfares 510, 516, either in place of, or in addition to, the virtual sign 508.

What is claimed is:

1. A method of correcting map data stored on a navigation system, said method comprising:
   displaying a representation of at least one of a thoroughfare and an intersection using said map data;
   displaying a user-selectable graphical indicator adjacent to or overlaid on the particular thoroughfare or intersection being displayed, said user-selectable graphical indicator graphically representing a travel restriction associated with at least one of:
      the particular thoroughfare or intersection being displayed; and
      a subsequent thoroughfare occurring after the particular thoroughfare or intersection being displayed;
   receiving a user selection of said user-selectable graphical indicator and in response thereto causing the display of one or more other user-selectable graphical indicators; and
   receiving a user selection of one of said other user-selectable graphical indicators and in response thereto causing a correction of the travel restriction to be added or removed from the map data stored in memory on the navigation system, said correction including both identification of the travel restriction and the relevant thoroughfare to which said travel restriction applies.

2. The method according to claim 1, wherein the user-selectable graphical indicator is in the form of a road sign.

3. The method according to claim 1, wherein said the user-selectable graphical indicator is displayed adjacent to a thoroughfare along which said navigation system is currently traveling.

4. The method according to claim 1, wherein said user-selectable graphical indicator is displayed in superposed relationship within delineations defining one or more thoroughfares displayed on a display of the navigation system.

5. The method according to claim 1, wherein said user-selectable graphical indicator relates to a current thoroughfare in which said navigation system is located.

6. The method according to claim 1, wherein said representation of at least one of a thoroughfare and an intersection is displayed in a 3D manner.

7. The method according to claim 1, wherein the user-selectable graphical indicator is displayed proximate to an imminently approaching thoroughfare intersection.

8. The method of claim 1 further comprising causing another correction of a travel restriction to be added or removed from the map data stored in memory on the navigation system, said another correction being dependent on the correction.

9. The method of claim 8, wherein the another correction is associated with one or more thoroughfares approaching or receding from the relevant thoroughfare.

10. A navigation system, comprising:
   a touch sensitive display;
   a processor;
   memory for storing map data and operating software;
   GPS signal reception means arranged with said touch sensitive display, processor and memory to enable display of a current position indicator and a representation of one or more thoroughfares using map data relevant to a current position of the navigation system;
   means for displaying a user-selectable graphical indicator adjacent to or overlaid on a current thoroughfare along which said navigation system is currently traveling, said user-selectable graphical indicator graphically representing a travel restriction associated with at least one of said current thoroughfare and a subsequent thoroughfare occurring after a thoroughfare intersection towards which said current thoroughfare leads; and means for causing a temporary display, in response to a user selection of said user-selectable graphical indicator, of one or more other user-selectable graphical indicators; and means for causing a correction of the travel restriction to be added or removed from the map data in said memory, in response to a user selection of one of said other user-selectable graphical indicators, said correction including both identification of the travel restriction and a relevant thoroughfare to which said travel restriction applies.

11. The navigation system of claim 10, wherein the navigation system comprises a portable navigation device (PND).

12. A navigation system comprising:
a processor;
a memory for storing map data and operating software; and
a touch sensitive display,
wherein said navigation system is configured to:
display on the touch sensitive display a representation of at least one of a thoroughfare and an intersection using said map data, and a user-selectable graphical indicator adjacent to or overlaid on the particular thoroughfare or intersection being displayed, said user-selectable graphical indicator graphically representing a travel restriction associated with at least one of: the particular thoroughfare or intersection being displayed; and a subsequent thoroughfare occurring after the particular thoroughfare or intersection being displayed;
display one or more other user-selectable graphical indicators in response to a received user selection of said user-selectable graphical indicator; and
add or remove from the map data stored in said memory a correction of the travel restriction in response to a received user selection of one of said other user-selectable graphical indicators, said correction including both identification of the travel restriction and the relevant thoroughfare to which said travel restriction applies.

13. The navigation system of claim 12, wherein the navigation system comprises a portable navigation device (PND).

14. The navigation system of claim 12, wherein the travel restriction is selected from the group consisting of: (i) a direction of travel; (ii) a time-dependent access restriction; (iii) a vehicle-dependent access restriction; and (iv) a speed limit.

15. The method of claim 1, wherein the travel restriction is selected from the group consisting of: (i) a direction of travel; (ii) a time-dependent access restriction; (iii) a vehicle-dependent access restriction; and (iv) a speed limit.

16. A computer program embodied in a non-transitory computer readable medium comprising computer program code arranged to run on a processor of a navigation system comprising a memory for storing map data and a touch sensitive display to cause the:
display of a representation of at least one of a thoroughfare and an intersection using said map data;
display of a user-selectable graphical adjacent to or overlaid on the particular thoroughfare or intersection being displayed, said user-selectable graphical indicator graphically representing a travel restriction associated with at least one of: the particular thoroughfare or intersection being displayed; and a subsequent thoroughfare occurring after the particular thoroughfare or intersection being displayed;
display of one or more other user-selectable graphical indicators in response to a received user selection of said user-selectable graphical indicator; and
addition or removal from the map data stored in memory of a correction of the travel restriction in response to a received user selection of one of said other user-selectable graphical indicators, said correction including both identification of the travel restriction and the relevant thoroughfare to which said travel restriction applies.

* * * * *